(12) United States Patent
Anderson

(10) Patent No.: US 7,882,584 B2
(45) Date of Patent: Feb. 8, 2011

(54) FISHERMAN'S TOOL

(76) Inventor: Chester S. Anderson, N10797 Poplar Dr., Tomahawk, WI (US) 54487

(*) Notice: Subject to any disclaimer, the term of this patent is extended or adjusted under 35 U.S.C. 154(b) by 69 days.

(21) Appl. No.: 12/423,850

(22) Filed: Apr. 15, 2009

(65) Prior Publication Data

US 2010/0263132 A1  Oct. 21, 2010

(51) Int. Cl.
*B25F 1/04* (2006.01)
*B26B 11/00* (2006.01)

(52) U.S. Cl. .......................................... 7/106
(58) Field of Classification Search ............... 7/106, 7/118–120, 158; 242/250, 323; 43/26.1
See application file for complete search history.

(56) References Cited

U.S. PATENT DOCUMENTS 4,887,777 A  12/1989  Rasmussen
6,045,234 A *  4/2000  Leeds ........................ 362/119
6,685,125 B1  2/2004  Tucci
7,086,622 B1  8/2006  Whaley
2005/0278865 A1*  12/2005  West ............................ 7/106

* cited by examiner

*Primary Examiner*—David B Thomas
(74) *Attorney, Agent, or Firm*—Dale J. Ream

(57) ABSTRACT

A fisherman's tool includes a housing having front and rear ends, a finger side having a plurality of channels for receiving a user's fingers, a thumb side opposite the finger side, and opposed proximal and distal sides. A knife is coupled to the housing for movement between a storage position stowed in the housing and a use position outside the housing. A user input is in data communication with the motor for selectively activating the motor. The fisherman's tool includes a rotatable actuator operatively coupled to the motor whereby the actuator rotates relative to the housing when the motor is activated, the actuator having a distal end with opposed arcuate walls to engage a fishing reel. A battery is in electrical communication with the motor.

13 Claims, 5 Drawing Sheets

FISHERMAN'S TOOL

BACKGROUND OF THE INVENTION

This invention relates generally to fishing accessories and, more particularly, to a tool for use with an ice fishing tip-up that enables a fishing line to be automatically extended or retracted.

Ice fishing is a popular sport, especially in northern climates where large lakes may be covered with thick ice for many months at a time. Typically, an ice fisherman must bore through the ice using an auger and then extend a fishing line with bait or a lure into the water. A "tip-up" is typically used to hold the line and is configured to signal the fisherman when a fish has been caught. At that point, or at the end of a fishing session even if no fish was hooked, the line must be retracted onto the fishing reel of the tip-up.

Ice fisherman often work multiple ice holes simultaneously, sometimes deep into the night or even through the entire night. Retracting all of the lines when it is time to go home can be a very inconvenient task as ice fishing reels may not have a traditional crank type reel. Even if only fishing from a single hole, reeling up a line from the cold water by hand to remove a caught fish is a difficult and unpleasant task, especially when the fisherman is wearing gloves due to cold temperatures.

Therefore, it would be desirable to have a motorized tool that enables a fisherman to automatically extend or retract a fishing line relative to an ice fishing hole. Further, it would be desirable to have a fishing tool that may be used by a person wearing gloves and that includes a light and other implements useful in ice fishing.

SUMMARY OF THE INVENTION

A fisherman's tool according to a preferred embodiment of the present invention includes a housing having front and rear ends, a finger side having a plurality of channels for receiving a user's fingers, a thumb side opposite the finger side, and opposed proximal and distal sides. A knife is coupled to the housing for movement between a storage position stowed in the housing and a use position outside the housing. A user input is in data communication with the motor for selectively activating the motor. The fisherman's tool includes a rotatable actuator operatively coupled to the motor whereby the actuator rotates relative to the housing when the motor is activated, the actuator having a distal end with opposed arcuate walls to engage a fishing reel. A battery is in electrical communication with the motor.

Therefore, a general object of this invention is to provide a tool to aid an ice fisherman reel up the line of an ice fishing tip-up.

Another object of this invention is to provide a fisherman's tool, as aforesaid, having a motorized actuator that engages the reel of the tip-up and is operable to extend or retract a fishing line.

Still another object of this invention is to provide a fisherman's tool, as aforesaid, having multiple implements that are movable between storage and use configurations relative to a housing.

Yet another object of this invention is to provide a fisherman's tool, as aforesaid, having a light for selectively illuminating a work area.

A further object of this invention is to provide a fisherman's tool, as aforesaid, that is operable while wearing gloves.

A still further object of this invention is to provide a fisherman's tool, as aforesaid, that is user-friendly and cost-effective.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
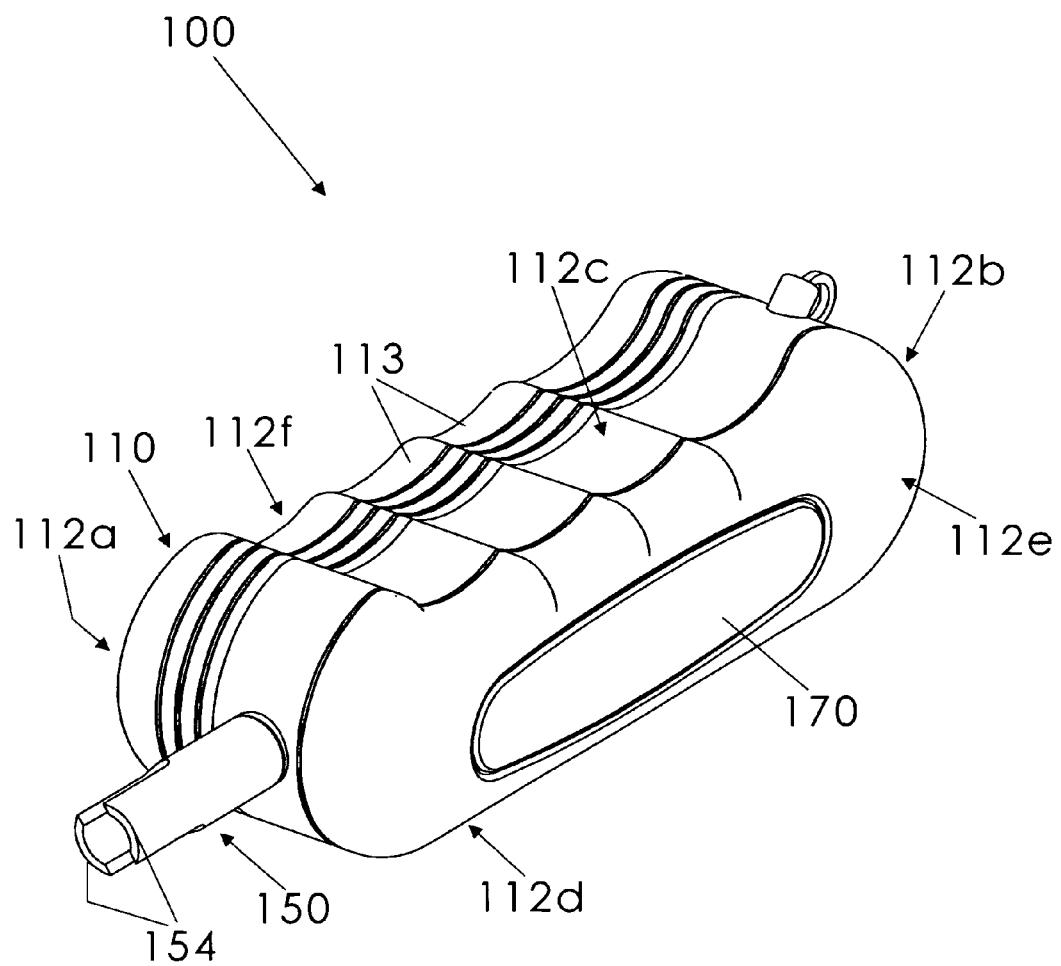
FIG. 1 is a perspective view of a fisherman's tool according to a preferred embodiment of the present invention, illustrated in a storage configuration.

A fisherman's tool will now be described in detail with reference to FIG. 1 through FIG. 5 of the accompanying drawings. More particularly, a fisherman's tool 100 of one embodiment includes a housing 110, a motor 130, a battery 140, and a rotatable actuator 150.

Figure 2:
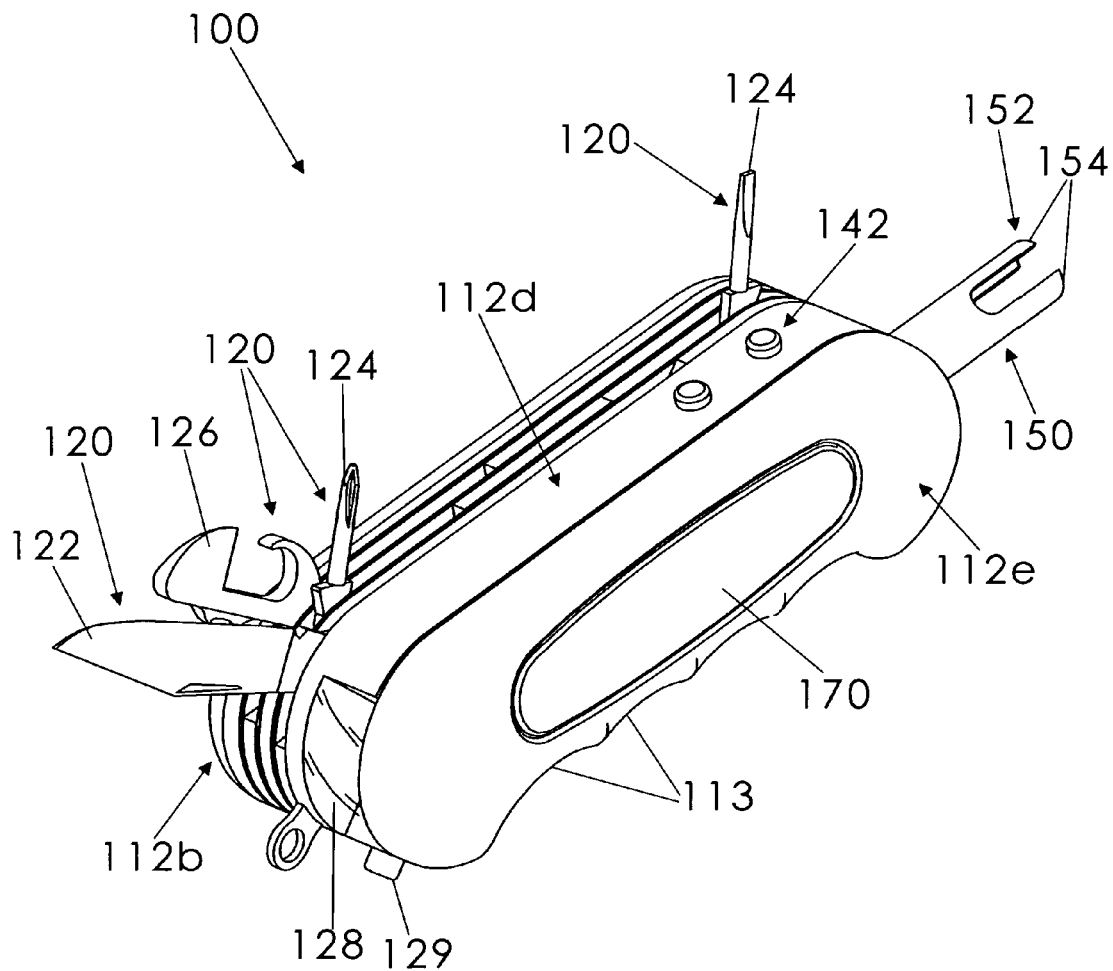
FIG. 2 is perspective view from another angle of the fisherman's tool illustrated in a use configuration.

As shown in FIG. 1 and FIG. 2, the housing 110 has front and rear ends 112a, 112b, opposed finger and thumb sides 112c, 112d, and opposed proximal and distal sides 112e, 112f. The finger side 112c may include a plurality of channels 113 for receiving a user's fingers. The housing 110 may be constructed of any combination of plastic, metal, wood, composite, and/or any other appropriate material, and it may be preferable for the housing 110 to be sized to be held by one hand.

Figure 3:
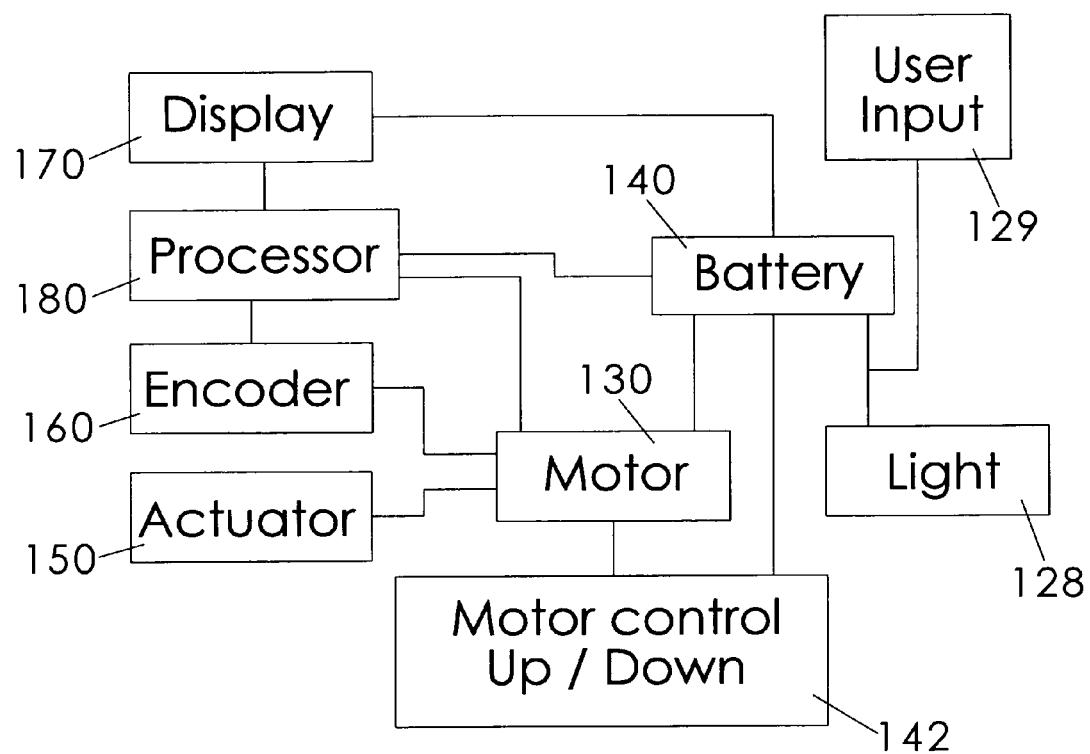
FIG. 3 is a block diagram of the electronic components of this invention.

A knife 122, a driver bit 124, an opener 126, and/or other implements 120 (e.g., pliers, etc.) may be coupled to the housing 110. In some embodiments, the implements 120 are coupled to the housing 110 such that the implements 120 are movable between storage positions stowed in the housing (FIG. 1) and use positions outside the housing 110 (FIG. 2). As shown in FIG. 2 and FIG. 3, a light 128 may be coupled to the housing 110 (e.g., at the housing rear end 112b) and in electrical communication with the battery 140 or another battery to selectively illuminate an area, and a user input 129 (e.g., button(s), switch(es), etc.) may be in electrical communication with the light 128 to selectively activate the light 128. The housing 110 may form a water resistant barrier (including a waterproof barrier) around the light 128.

The motor 130 (FIG. 3) is located in the housing 110, and the housing 110 may form a water resistant barrier (including a waterproof barrier) around the motor 130. The motor 130 is in electrical communication with the battery 140, and the housing 110 may similarly form a water resistant barrier (including a waterproof barrier) around the battery 140. As shown in FIG. 2 and FIG. 3, a user input 142 (e.g., button(s), switch(es), etc.) is in data communication with the motor 130 for selectively activating the motor 130. The user input 142 may be located at the housing thumb side 112d (FIG. 2), the housing distal side 112f, or any other appropriate location.

As shown in FIG. 2, the rotatable actuator 150 has a distal end 152 with opposed arcuate walls 154 to engage a fishing reel 10 (FIG. 5), and the arcuate walls 154 may be spaced apart from one another. The actuator 150 may be at the housing front end 112a, as shown in FIG. 1 and FIG. 2, and the actuator 150 is operatively coupled to the motor 130 (FIG. 3) such that the actuator 150 rotates relative to the housing 110 when the motor 130 is activated. Means may be included for the motor 130 to rotate the actuator 130 relative to the housing 110 in opposite (e.g., "forward" and "reverse") directions. For example, the motor 130 may operate an output shaft in opposite directions, or gearing between the motor's output shaft and the actuator 150 may be included to alter directions. When the motor 130 is not activated, the actuator 150 may be substantially stationary relative to the housing 110. In some embodiments, the actuator 150 may additionally be released to allow the actuator 150 to rotate relative to the housing 110 when the motor 130 is not activated.

Turning again to FIG. 3, an encoder 160 may be in data communication with the motor 130, a display 170 may be in electrical communication with the battery 140 or another battery, and a processor 180 may be in data communication with the encoder 160, the display 170, and the motor 130. The display may be coupled to the housing 110 and may be a LCD display, a seven segment LED display, or any other appropriate display. The processor 180 may include various programming, such as programming to activate the display 170 to present distance information using data from the encoder 160, and programming to store a number of rotations of the actuator 150 and activate the motor 130 to rotate the actuator 150 the stored number of rotations.

Figure 4:
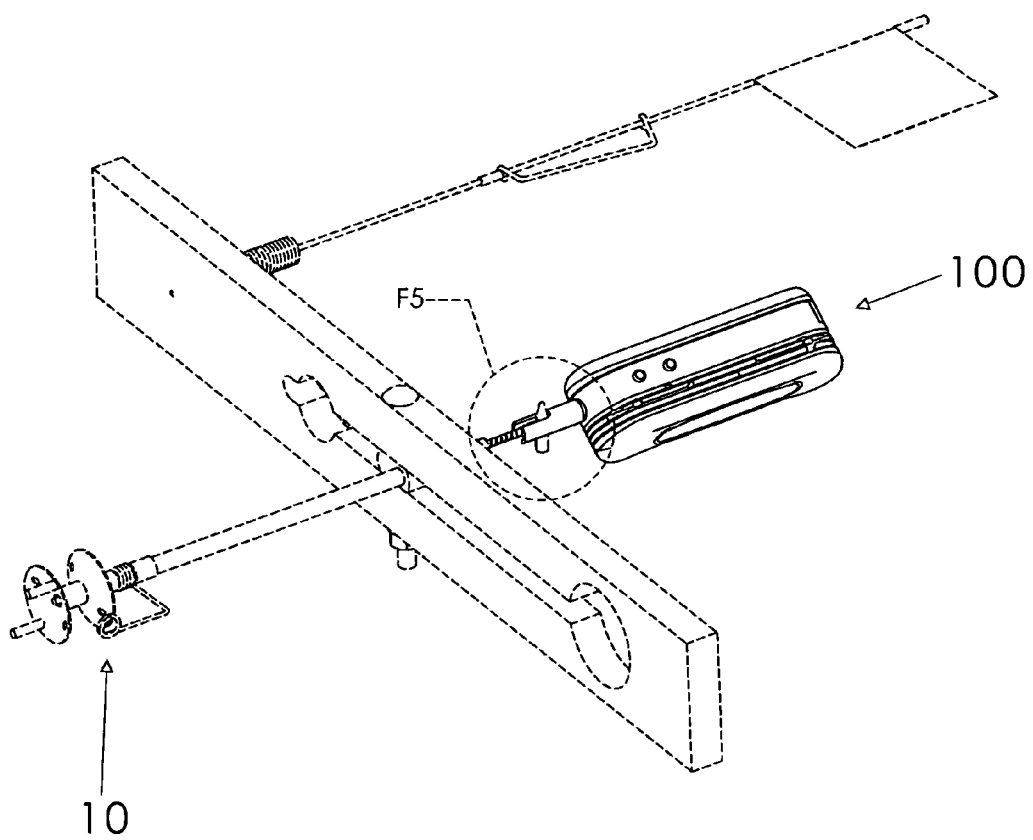
FIG. 4 is a perspective view of the fisherman's tool in use with an ice fishing tip-up.
Figure 5:
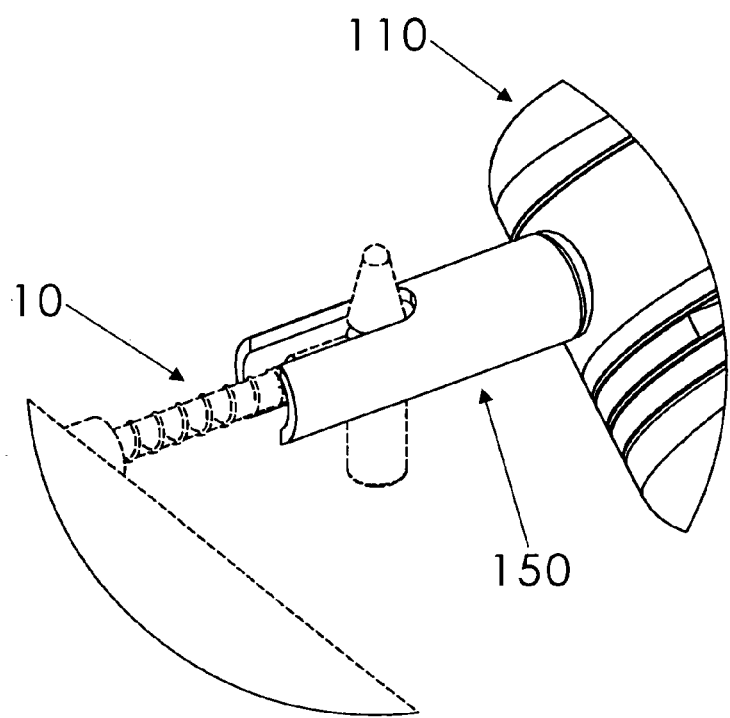
FIG. 5 is an isolated view on an enlarged scale taken from FIG. 4.

In use, the implements 120 may be moved to the use positions outside the housing 110 (FIG. 2) and utilized as desired, and then returned to the storage positions (FIG. 1), and the user input 129 may be used to activate the light 128. As shown in FIG. 4 and FIG. 5, the actuator 150 may engage a fishing reel 10 (e.g., a reel used for ice fishing). After the fishing reel 10 is engaged, rotating the actuator 150 may cause the reel 10 to rotate (i.e., to increase or decrease a length of the fishing line that is extended into the water). As set forth above, the motor 130 may rotate the actuator 150 upon input to the user input 142, or rotating the housing 110 may cause the actuator 150 to rotate. Manually rotating the housing 110 may be especially useful if the battery 140 is not sufficiently charged.

If the encoder 160 is included, it (or the processor 180) may be preset to a certain type of fishing reel 10, or information regarding the type of fishing reel 10 being used may be input to the encoder 160 or the processor 180, as different fishing reels may release or capture different amounts of fishing line over the same number of rotations. Inputting data to encoders and processors is well known in the art, as should be readily appreciated. As the actuator 150 turns to release fishing line into the water, the encoder 160 (or the processor 180 using information from the encoder 160) may determine a distance of the fishing line that has been released, and the processor 180 may activate the display 170 to present that distance. As set forth above, the encoder 160 and processor 180 may also be used to activate the motor 130 to rotate the actuator 150 a stored number of rotations. This may, for example, allow the user to automatically release an amount of fishing line to reach a desired depth.

It is understood that while certain forms of this invention have been illustrated and described, it is not limited thereto except insofar as such limitations are included in the following claims and allowable functional equivalents thereof.

The invention claimed is:

1. A fisherman's tool, comprising:
   a housing having front and rear ends, a finger side having a plurality of channels for receiving a user's fingers, a thumb side opposite said finger side, and opposed proximal and distal sides;
   a knife coupled to said housing for movement between a storage position stowed in said housing and a use position outside said housing;
   a motor in said housing;
   a user input in data communication with said motor for selectively activating said motor;
   a rotatable actuator operatively coupled to said motor whereby said actuator rotates relative to said housing when said motor is activated, said actuator having a distal end with opposed arcuate walls to engage a fishing reel; and
   a battery in electrical communication with said motor.

2. The fisherman's tool of claim 1, wherein said opposed arcuate walls are separated from one another and said housing is sized to be held by one hand.

3. The fisherman's tool of claim 2, wherein the housing forms a water resistant barrier around said motor.

4. The fisherman's tool of claim 3, further comprising:
   a light coupled to said housing to selectively illuminate an area, said light being in electrical communication with said battery or another battery; and
   a user input in electrical communication with said light for selectively activating said light.

5. The fisherman's tool of claim 4, wherein:
   said user input in data communication with said motor is located on at least one of said thumb side and said distal side;
   said actuator is at said housing front end; and
   said light is at said housing rear end.

6. The fisherman's tool of claim 5, wherein said actuator is substantially stationary relative to said housing when said motor is not activated.

7. The fisherman's tool of claim 6, further comprising:
   means for said motor to rotate said actuator relative to said housing in forward and reverse directions;
   an encoder in data communication with said motor;
   a display; and
   a processor in data communication with said encoder and said display to activate said display to present distance information using data from said encoder.

8. The fisherman's tool of claim 7, further comprising programming in said processor to store a number of rotations of said actuator and activate said motor to rotate said actuator said stored number of rotations.

9. The fisherman's tool of claim 8, further comprising at least one driver bit coupled to said housing for movement between a storage position stowed in said housing and a use position outside said housing.

10. The fisherman's tool of claim 9, wherein the housing forms a water resistant barrier around said light.

11. The fisherman's tool of claim 1, wherein said actuator is substantially stationary relative to said housing when said motor is not activated.

12. The fisherman's tool of claim 1, further comprising:
   means for said motor to rotate said actuator relative to said housing in forward and reverse directions;
   an encoder in data communication with said motor;
   a display; and
   a processor in data communication with said encoder and said display to activate said display to present distance information using data from said encoder.

13. The fisherman's tool of claim 12, further comprising programming in said processor to store a number of rotations of said actuator and activate said motor to rotate said actuator said stored number of rotations.

* * * * *